United States Patent [19]

Taguchi et al.

[11] 4,370,680
[45] Jan. 25, 1983

[54] COLOR SIGNAL PROCESSING DEVICE FOR VIDEO RECORDER

[75] Inventors: Shinichiro Taguchi; Nobuya Nagao; Yutaka Ogihara, all of Fukaya, Japan

[73] Assignee: Tokyo Shibaura Denki Kabushiki Kaisha, Kawasaki, Japan

[21] Appl. No.: 238,022

[22] Filed: Feb. 25, 1981

[51] Int. Cl.³ ............................................ H04N 9/491
[52] U.S. Cl. .................................................. 358/330
[58] Field of Search ...................... 358/4, 8, 23, 25, 26, 358/27, 6, 7

[56] References Cited

U.S. PATENT DOCUMENTS

| | | | |
|---|---|---|---|
| 4,041,526 | 8/1977 | Kaneko | 358/26 X |
| 4,157,565 | 6/1979 | Kuniyoshi et al. | 358/8 |
| 4,208,674 | 6/1980 | Kuniyoshi et al. | 358/8 |
| 4,326,216 | 4/1982 | Jensen | 358/8 |

Primary Examiner—Aristotelis M. Psitos
Attorney, Agent, or Firm—Cushman, Darby & Cushman

[57] ABSTRACT

In the recording operation of a video recorder, a color signal (3.58 MHz) is frequency-converted to a low frequency converted color signal (688 kHz) by a color signal processing device. In the reproducing operation of the video tape recorder, the regenerative low frequency converted signal (688 kHz) is reconverted to the color signal of original frequency (3.58 MHz) by the color signal processing device. The signal (3.58 MHz or 688 kHz) which has passed a switching circuit is gain-controlled by a color signal amplifier and is input to a balanced modulator. A converting signal (FO3=4.27 MHz) is also input to the balanced modulator. The output of the balanced modulator is obtained as a frequency-converted signal (688 kHz or 3.58 MHz) through a low-pass filter or a band-pass filter. The converting signal (F03=4.27 MHz) is obtained by balanced modulation, at a second balanced modulator, of an oscillation output (3.58 MHz) of a first voltage controlled oscillator and a divided output (f02=688 kHz) of a divider for dividing the output of a second voltage controlled oscillator.

5 Claims, 13 Drawing Figures

COLOR SIGNAL PROCESSING DEVICE FOR VIDEO RECORDER

The present invention relates to a color signal processing device for a video tape recorder, with exceptionally good efficiency.

When video signals of for example an NTSC system are recorded on a magnetic tape with a video tape recorder, they are processed in a manner as described below. The video signal is first separated into a luminance signal and a color signal (3.58 MHz). The luminance signal is frequency-modulated, and the color signal (3.58 MHz) is converted to a low frequency (688 kHz). (The frequency-modulated luminance signal will be referred to as the FM luminance signal, and the color signal converted to the low frequency will be referred to as the low frequency converted color signal). The FM luminance signal and the low frequency converted color signal are mixed and recorded to a magnetic tape. In the reproducing operation of the video tape recorder, the signal output from the head is separated into the FM luminance signal and the low frequency converted color signal (688 kHz). The FM luminance signal is demodulated by a frequency demodulater, and the low frequency converted signal is reconverted to the original frequency (3.58 MHz) by a balanced modulator.

The demodulated luminance signal and the color signal reconverted to the original frequency are mixed into a regenerative video signal.

A color signal processing device is used for converting the color signal (3.58 MHz) into the low frequency converted color signal (688 kHz), or reconverting the low frequency converted color signal (688 kHz) into the color signal of the original frequency (3.58 MHz). The color signal processing device generally comprises a balanced modulator, a carrier signal generating means, and so on. In the recording operation of the video tape recorder, the color signal (3.58 MHz) is input to the balanced modulator. In the reproducing operation of the video tape recorder, the regenerative low frequency converted color signal (688 kHz) is input into the balanced modulator.

In the recording operation of the video tape recorder, it is preferable to synchronize the frequency of the carrier signal with that of the horizontal sync signal in the recorded video signal, and to synchronize its phase with that of the burst signal. In order to respond to this need, it is necessary to incorporate both an automatic frequency control loop (AFC loop) and an automatic phase control loop (APC loop) in the carrier signal generating means. In the reproducing operation of the video tape recorder, it is necessary to cancel the time base fluctuation components of the regenerative low frequency converted color signal. In order to respond to this need, it is necessary to incorporate an automatic phase control loop (APC loop) in the carrier signal generating means. As a result of this, the color signal processing device becomes extremely complex in structure. Furthermore, when this color signal processing device is composed of integrated circuits, the number of pins becomes fairly large. Since the APC loop is not used in the recording operation of the video tape recorder, the operation efficiency of the system as a whole is inferior.

It is an object of the present invention to provide a color signal processing device in which as large a number of parts as possible are used for the dual purpose of converting a color signal into a low frequency converted color signal and reconverting the low frequency converted color signal into the color signal of the original frequency, so that the overall system may be simple in construction, the operation efficiency may be improved, and the device may be suitably composed of integrated circuits.

In order to achieve the above and other ends, the present invention provides a color signal processing device characterized by comprising:

a color signal amplifying circuit to which is selectively input through a first switching circuit a original color signal or a regenerative low frequency converted color signal according to the recording/reproducing mode of a video tape recorder, and which is gain-controlled by gain control means;

a first balanced modulator to which is input an output of the color signal amplifying circuit as well as a converting signal to provide a balanced modulated output of both input signals, and which has a control terminal for enabling control by color killer means;

a low-pass filter and a band-pass filter to which is input an output of the first balanced modulator;

a second switching circuit, to a first input terminal of which is input an output of the color signal amplifying circuit, and to a second input terminal of which is input an output of the band-pass filter, for selectively obtaining the signal at the first input terminal or the second input terminal according to the recording/reproducing mode of the video tape recorder;

a first phase detector, to one input terminal of which is input an output of the second switching circuit, and to the other input terminal of which is input an oscillation output of a first voltage controlled oscillator, for performing phase difference detection of the two input signals in a period of a burst signal;

a third switching circuit, to which is input a phase detection output of the first phase detector, and which inputs or does not input this to an oscillation output control terminal of the first voltage controlled oscillator according to the recording/reproducing mode of the video tape recorder;

a second balanced modulator, to one input terminal of which is input an oscillation output of the first voltage controlled oscillator, and to the other input terminal of which is input a divided output of a first divider for dividing the oscillation output of a second voltage controlled oscillator, for applying a balanced modulated output of the two input signals to a converting signal input terminal of the first balanced modulator through a filter;

a second phase detector, to one input terminal of which is input a divided output of a second divider for dividing an oscillation output of the second voltage controlled oscillator, and to the other input terminal of which is input a horizontal sync signal, for obtaining a phase-detection output corresponding to a frequency synchronization error of the two input signals; and a fourth switching circuit, to a first input terminal of which is input a phase detection output of the second phase detector, and to a second input terminal of which is input a detection output of the first phase detector, for selectively inputting signals of the first and second input terminals to an oscillation output control terminal of the second voltage controlled oscillator according to the recording/reproducing mode of the video tape recorder.

This invention can be more fully understood from the following detailed description when taken in conjunction with the accompanying drawings, in which:

FIGS. 1(a) to 1(d) show frequency band characteristics for explaining signal processing in a video tape recorder;

Figure 2:
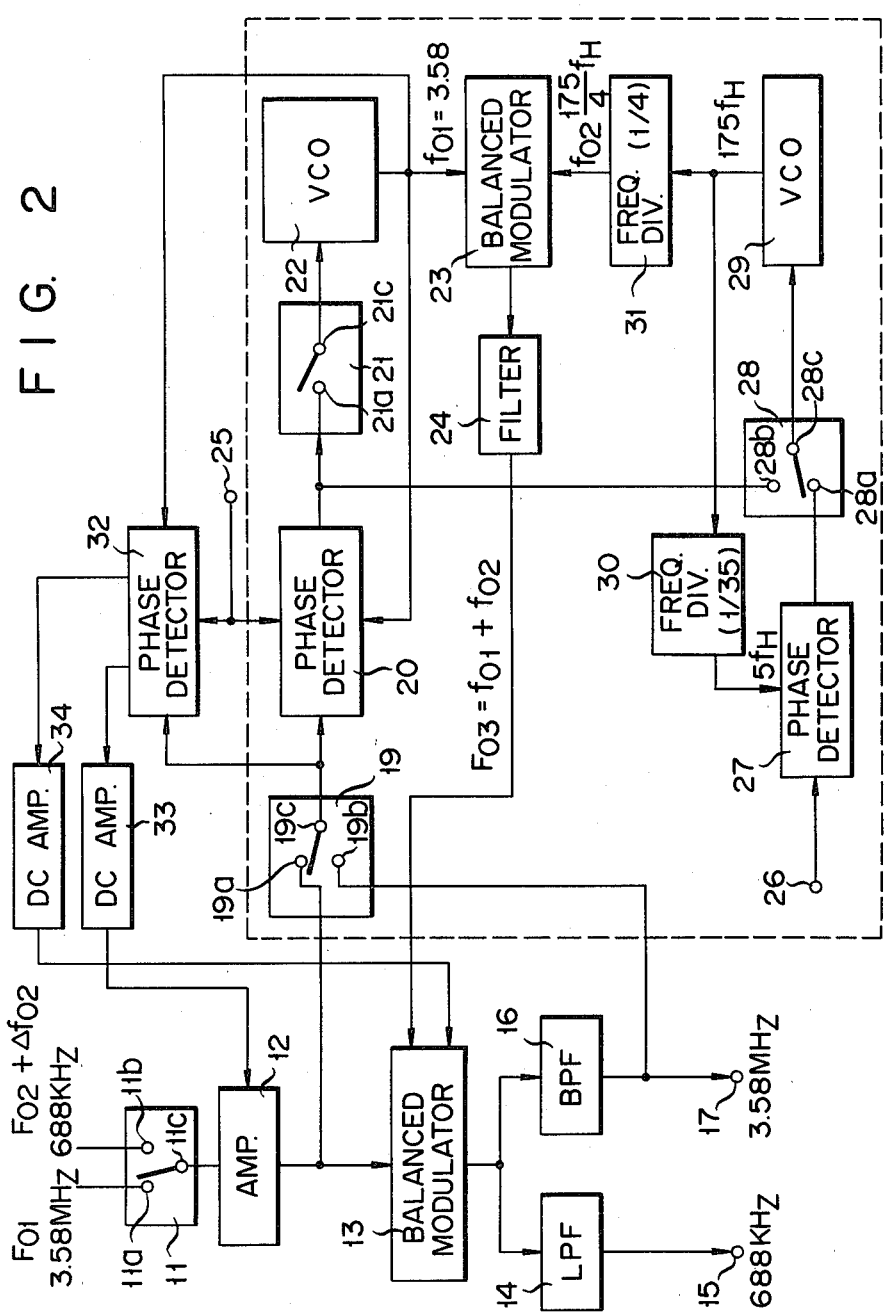
FIG. 2 is a block diagram of an embodiment of the color signal processing device of the present invention.
Figure 3:
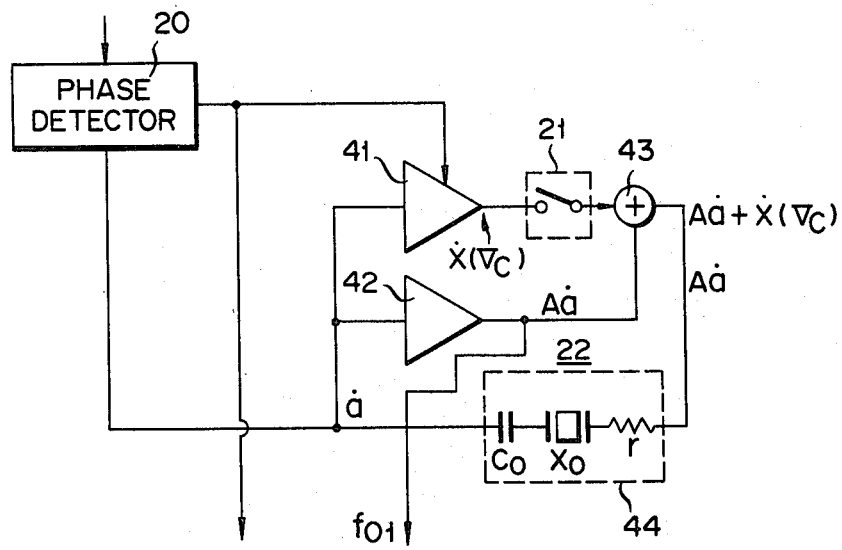
FIG. 3 is a block diagram of the first voltage controlled oscillator shown in FIG. 2.
Figure 4:
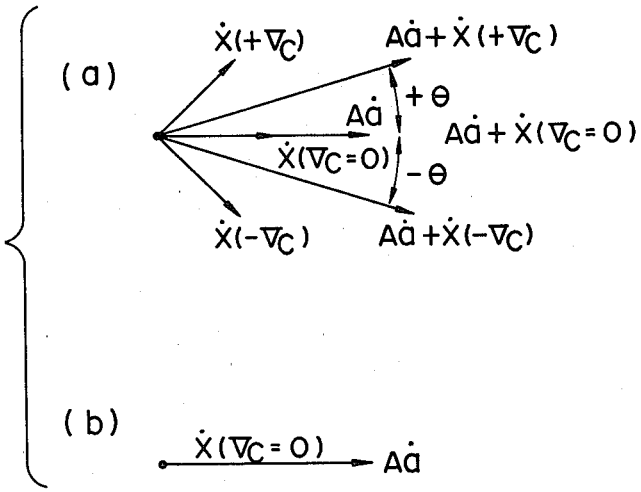
Figure 5:
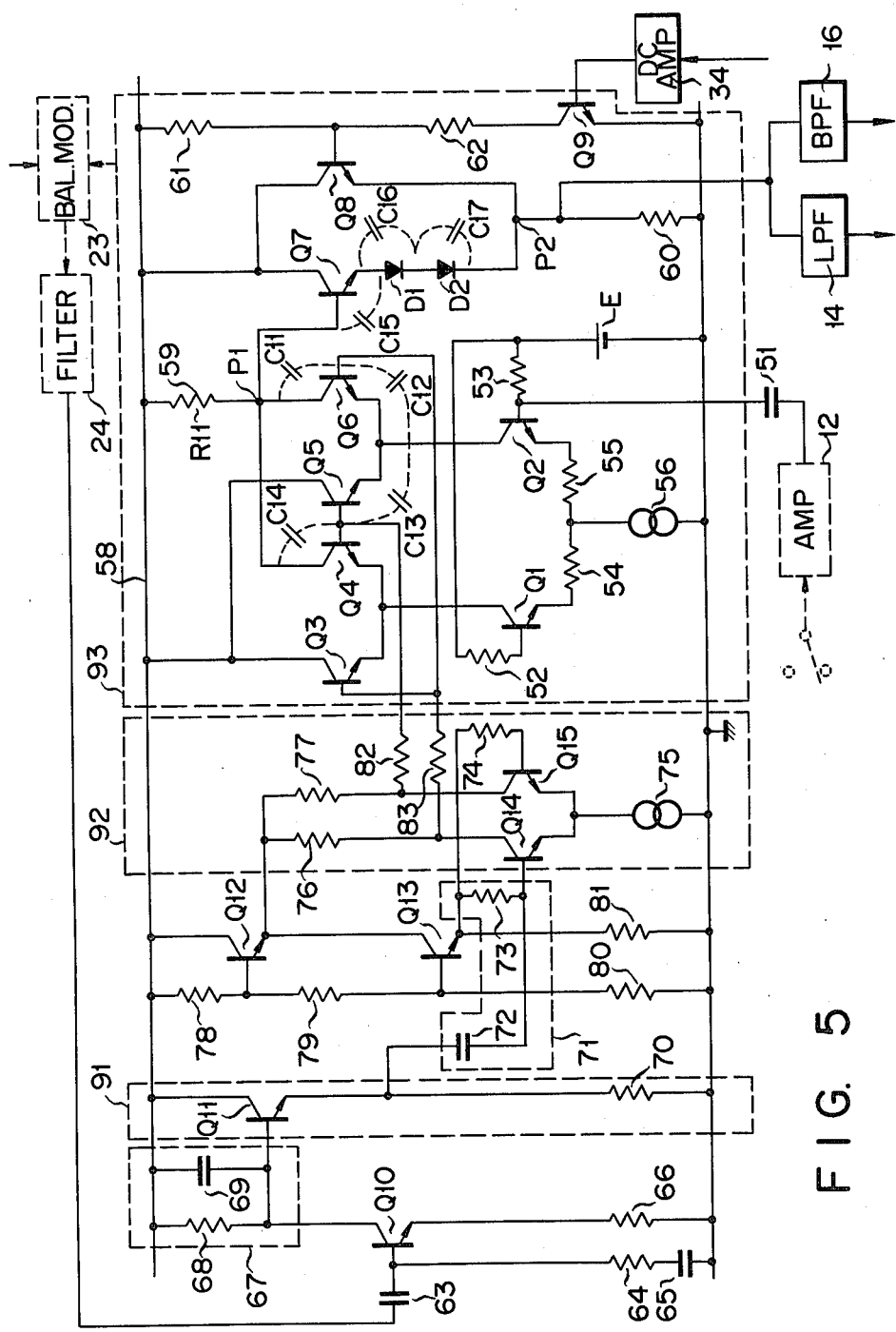
Figure 6:
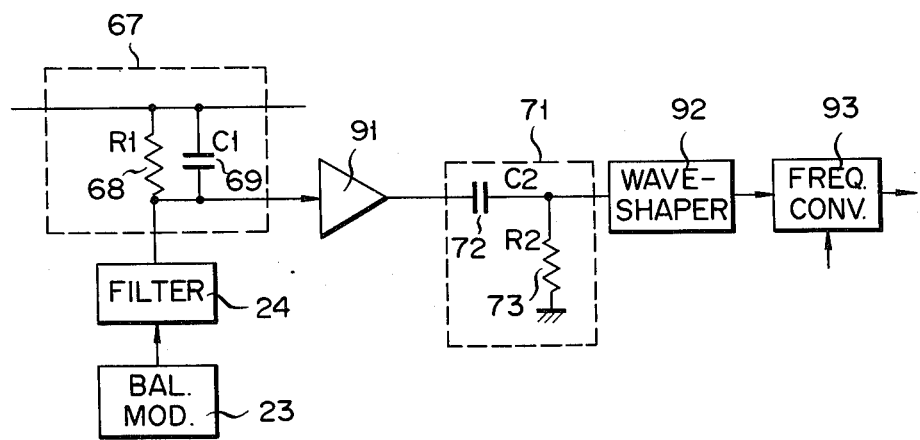

FIGS. 4(a) and 4(b) are vector diagrams for explaining the mode of operation of the circuit shown in FIG. 3;

FIG. 5 is a circuit diagram of the first balanced modulator shown in FIG. 2;

FIG. 6 is a view equivalently illustrating FIG. 5; and

Figure 7:
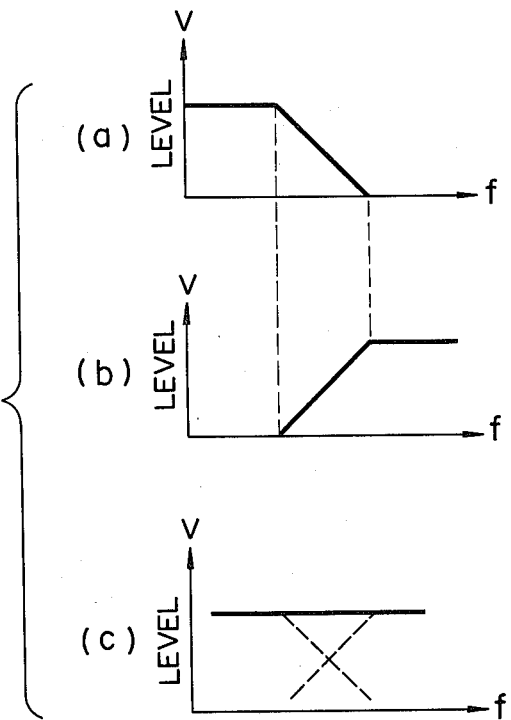

FIGS. 7(a) to 7(c) show frequency characteristics for illustrating the filter characteristics of the circuit shown in FIGS. 5 and 6.

Figure 1:
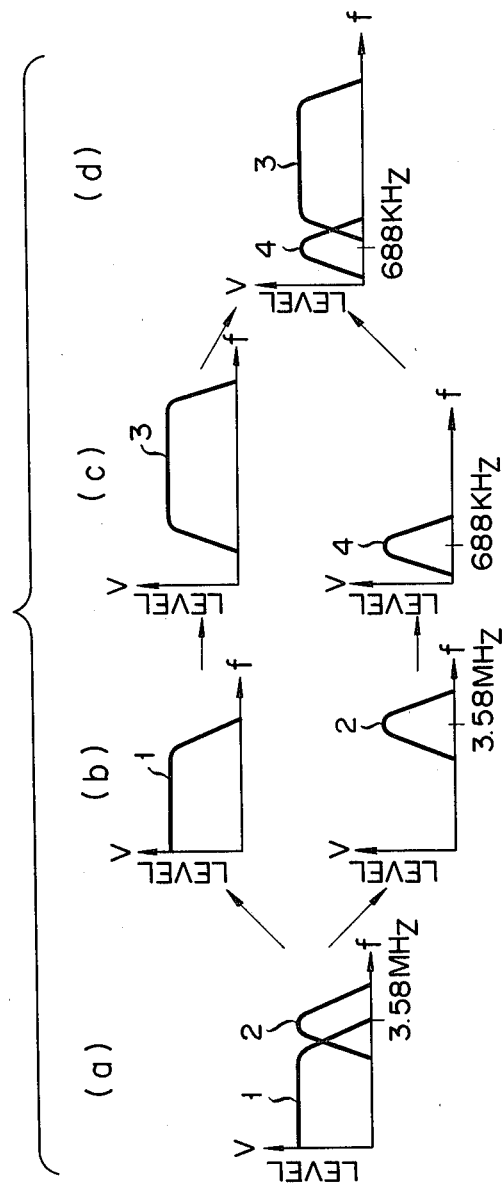

FIGS. 1(a) to 1(d) show the process of signal processing when video signals of the NTSC system are recorded on magnetic tape in a video tape recorder (to be referred to as a VTR hereinafter). The recording video signal consists of a luminance signal 1 and a color signal 2 as shown in FIG. 1(a). The luminance signal 1 and the color signal 2 are separated by a low-pass filter and a band-pass filter (FIG. 1(b)). The luminance signal 1 is frequency-modulated by a frequency modulator to provide an FM luminance signal 3. The color signal 2 is converted to a low frequency signal by a color signal processing device to provide a low frequency converted color signal 4 (FIG. 1(c)). A composite signal of the FM luminance signal 3 and the low frequency converted signal 4 is made by a mixer (FIG. 1(c)) and recorded on a magnetic tape. In the reproducing operation of the VTR, the opposite processing to that described above is performed. The signal output from the head is separated into an FM luminance signal and a regenerative low frequency converted color signal. The separated FM luminance signal is demodulated by a frequency demodulator, and the regenerative low frequency converted color signal is reconverted to the original frequency by the color signal processing device. The demodulated luminance signal and the color signal converted to the original frequency are made composite by a mixer to provide a regenerative video signal.

Specifically, the present invention relates to a color signal processing device.

FIG. 2 shows the color signal processing device of the present invention. Referring to FIG. 2, reference numeral 11 denotes a first switching circuit which is switched to an input terminal 11a side during the recording operation and to an input terminal 11b side during the reproducing operation. A recording color signal (3.58 MHz) is input to the input terminal 11a. A regenerative low frequency converted color signal (688 kHz) is input to the input terminal 11b. An output terminal 11c of the first switching circuit 11 is connected to a color signal amplifier 12. The output terminal of the color signal amplifier 12 is connected to a first balanced modulator 13 as well as to one input terminal 19a of a second switching circuit 19.

Frequency conversion of the color signal is performed in the first balanced modulator 13. In the recording operation of the VTR, the color signal of 3.58 MHz is converted to a low frequency converted color signal of 688 kHz which is obtained at an output terminal 15 through a low-pass filter 14. During the reproducing operation, the regenerative converted low frequency color signal of 688 kHz is reconverted to a color signal of 3.58 MHz and is obtained at an output terminal 17 through a band-pass filter 16. A converting signal F03 is necessary to obtain the frequency conversion of the color signal. A converting signal generating means for producing converting signals is constructed in the manner to be described below. The second switching circuit 19 has input terminals 19a and 19b. The input terminal 19a is selected during the recording operation of the VTR, and the input terminal 19b is selected during the reproducing operation of the VTR. The input terminal 19a is connected to the output terminal of the band-pass filter 16. An output terminal 9c of the second switching circuit 19 is connected to a first phase detector 20. This first phase detector 20 detects the difference between the phase of an oscillation output of a first voltage controlled oscillator 22 and that of an output of the second switching circuit 19. A burst gate pulse is input from an input terminal 25 to the first phase detector 20. The output of the first phase detector 20 is utilized to represent the phase difference between the burst signal and the output of the second switching circuit. 19. The output terminal of the first phase detector 20 is connected to an input terminal 21a of a third switching circuit 21 as well as to an input terminal 28b of a fourth switching circuit 28. An output terminal 21c of the third switching circuit 21 is connected to an oscillation frequency control terminal of the first voltage controlled oscillator 22. The first phase detector 20, the switching circuit 21, and the voltage controlled oscillator 22 comprise an automatic phase control (APC) circuit. The output (3.58 MHz) of the first voltage controlled oscillator 22 is supplied to one input terminal of a second balanced modulator 23. The output of an automatic frequency control (AFC) circuit is input to the other input terminal of the second balanced modulator 23. The AFC circuit comprises a second phase detector 27, the fourth switching circuit 28, a second voltage controlled oscillator 29, and a divider 30. The second voltage controlled oscillator 29 has an oscillation frequency of $175 \times f_H$ (wherein $f_H$ stands for the frequency of the horizontal synchronizing signal). The oscillation output of the second voltage controlled oscillator 29 is divided to 1/35 by the divider 30. The phase and frequency of the divided output $5 f_H$ of the divider 30 is compared with a horizontal sync signal by the second phase detector 27. The horizontal synchronizing signal is input through an input terminal 26. The output terminal of the second phase detector 27 is connected to an input terminal 28a of the fourth switching circuit 28. The output of the second phase detector 27 represents the synchronization error between the output of the divider 30 and the horizontal synchronizing signal. The fourth switching circuit 28 is switched to the input terminal 28a during the recording operation of the VTR and to the input terminal 28b during the reproducing operation of the VTR. The output terminal 28c of the fourth switching circuit 28 is connected to an oscillation frequency control terminal of the second voltage controlled oscillator 29. The oscillation output of the second voltage controlled oscillator 29 is input to a divider 31 to be divided to $\frac{1}{4}$. The divided ouput f02 of the divider 31 ($175/4 f_H=688$ KHz) is input to the second balanced modulator 23. The balanced modulation output of the second balanced modulator 23 passes through a band-pass filter 24 and is input to the first balanced modulator 13 as a carrier signal.

The color signal processing device includes an automatic color signal gain control loop and a color killer means. The output of the first switching circuit 19 is supplied to one input terminal of a third phase detector 32, and the oscillation output (3.58 MHz) of the first voltage controlled oscillator 22 is supplied to its other input terminal. In the third phase detector 32, phase difference detection of the burst signal and the oscillation output of the first voltage controlled oscillator 22 is performed during the burst period. This phase difference detection is performed by the synchronizing detection system and utilizes, for example, a differential amplifier with a 90° phase shifter at one input terminal. The output of the third phase detector 32 is input to DC amplifiers 33 and 34. The output of the DC amplifier 33 is supplied to the gain control terminal of the color signal amplifier 12. The output of the DC amplifier 34 is supplied to a switch part of the output circuit of the first balanced modulator 13.

In the recording operation of the VTR with a color signal processing device, the first, second and fourth switching circuits 11, 19 and 28 are switched to the input terminals 11a, 19a and 28a, respectively. The third switching circuit 21 is turned on. The color signal for recording (3.58 MHz) is input to the color signal amplifier 12 through the first switching circuit 11 and is gain-controlled thereby. The color signal for recording (3.58 MHz) is converted into a low frequency converted color signal (688 kHz) by the first balanced modulator 13. This low frequency converted color signal (688 kHz) appears at the output terminal 15 through the filter 14. The converting signal F03 is phase-synchronized with the burst signal (3.58 MHz) and frequency- and phase-synchronized with the horizontal synchronizing signal $f_H$. The first phase detector 20, the third switching circuit 21, and the first voltage controlled oscillator 22 comprise an automatic phase control (APC) loop. The first phase detector 20 detects the phase difference between the burst signal and the oscillation output (f01 = 3.58 MHz) of the first voltage controlled oscillator 22 during the burst gate pulse period. When there is a phase difference between the burst signal and the oscillation output (f01 = 3.58 MHz), the first phase detector 20 outputs an error voltage. The error voltage is applied to the oscillation frequency control terminal of the first voltage controlled oscillator 22 through the third switching circuit 21. By this operation, the oscillation output (f01 = 3.58 MHz) of the first voltage controlled oscillator 22 is phase-locked with the burst signal. This indicates that the color signal for recording (3.58 MHz) is frequency-modulated with high reliability into a low frequency converted color signal (688 kHz).

The APC loop is capable of correcting fluctuations by the comparing operation of the oscillation output and the burst signal when the output frequency of the first voltage controlled oscillator 22 itself has fluctuations due to temperature changes. The converting signal F03 is also frequency- and phase-synchronized with the horizontal sync signal $f_H$. The second phase detector 27 compares the phase and frequency of the horizontal sync signal $f_H$ with those of the divided output 5 $f_H$ of the divider 30. The output (representing the synchronization error) of the second phase detector 27 is supplied to the oscillation frequency control terminal of the second voltage controlled oscillator 29 (of the oscillation output 175 $f_H$) through the fourth switching circuit 28. By this operation, the oscillation output (175 $f_H$) of the second voltage controlled oscillator 29 is phase- and frequency synchronized with the horizontal sync signal. This indicates that the relation of the frequencies of the color signal and the luminance signal before recording is kept equal to that after recording. In the second balanced modulator 23, the summation and difference components (f01±f02) of the oscillation output frequency (f01 = 3.58 MHz) of the first voltage controlled oscillator 22 and the divided output frequency $$\left( f02 = \frac{175}{4} f_H \right)$$

of the divider 31 are obtained. The summation component (f01+f02) is obtained by the bandpass filter 24 as a converting signal F03. The first balanced modulator 13 outputs a signal having a frequency which is the beat frequency of the output (f01+f02=F03) of this filter 24 with the color signal F01. Consequently, the summation component (2f01+f02) and the difference component f02 of the output (f01+f02) of the filter 24 with the frequency f01 of the color signal are obtained (F01 = 3.58 MHz, f01 = 3.58 MHz). The difference component (f02 = 688 KHz) is extracted by the filter 14 and supplied at the output terminal 15.

In the reproducing operation of the VTR, the first, second and fourth switching circuits 11, 19 and 28 are switched to the input terminals 11b, 19b, and 28b. The third switching circuit 21 is turned off. The regenerative low frequency converted color signal (F02+Δf02) is input to the automatic color signal amplifier 12 through the first switching circuit 11 (where Δf02 is the time base fluctuation component of the regenerative low frequency converted color signal). In the first balanced modulator 13, a signal having a frequency equal to the beat frequency of the regenerative low frequency converted color signal (F02+Δf02) with the converting signal (F03=f01+f02) is obtained to provide the summantion component (f01+2f02+Δf02) and the difference component (f01−Δf02) of the two signals. The difference component (f01−Δf02) is extracted by the filter 16. The output (f01−Δf02) of the filter 16 is input to the first phase detector 20 through the second switching circuit 19. The first phase detector 20 detects the phase difference between the burst signal and the oscillation output of the first voltage controlled oscillator 22 during the burst signal period. The first voltage controlled oscillator 22 is switched to the stationary oscillation status at this time. Accordingly, the output of the first phase detector 20 represents the phase fluctuations of the reproduced burst signal. That is, the time base fluctuation component Δf02 contained in the regenerative low frequency converted color signal (F02+Δf02) is detected by the first phase detector 20. The output error voltage ΔV from the first phase detector 20 is supplied to the oscillation output control terminal of the second voltage controlled oscillator 29 through the fourth switching circuit 28. Thus, the oscillation output of the second voltage controlled oscillator 29 fluctuates similarly to the time base fluctuations of the regenerative low frequency converted color signal. Accordingly, the divided output of the divider 31 also fluctuates similarly to the time base fluctuations of the regenerative low frequency converted color signal (the divided output may be represented as f02+Δf02). In the second balanced modulator 23, a signal having a frequency equal to the beat frequency of the divided output ($f02+\Delta f02$) with the oscillation output ($f01=3.58$ Mhz) is obtained. The converting signal ($F03=f01+f02+\Delta f02$) is extracted from the band-pass filter 24. A signal having a frequency equal to the beat frequency of this converting signal ($F03=f01+f02+\Delta f02$) with the regenerative low frequency converted color signal ($f02+\Delta f02$) is obtained at the first balanced modulator 13. The summation component ($f01+2f02+2\Delta f02$) and the difference component $f01$ of the two input signals are obtained from the first balanced modulator 13. The difference component $f01$ is extracted by the filter 16 as the regenerative color signal (3.58 MHz) and is supplied at the output terminal 17. Consequently, the time base fluctuation components of the regenerative low frequency converted color signal are removed by the converting signal generating system described hereinabove. A regenerative color signal of stable frequency is obtained at the output terminal 17.

As has been described already, in the color signal processing device of the present invention, during the recording operation of the VTR, the color signal is converted into the low frequency converted color signal, and during the reproducing operation of the VTR, the regenerative low frequency converted color signal is reconverted to the color signal of the original frequency.

The system of the color signal processing device described above is simple in circuit configuration and is capable of adequately performing all its functions. In a VTR, color signal processing for the recording operation and color signal processing for the reproducing operation are required. In this case, it is preferable for a color signal processing device to have as many circuit parts as possible which may be used for both the recording and reproducing operations. In the color signal processing device described above, most of the circuit parts are used for both the recording and reproducing operations. This is extremely effective for making the overall circuit configuration simpler and for improving the operating efficiency. Furthermore, the simplicity of the circuit system lends itself to formation by integrated circuits. The signal input to the third phase detector 32 through the second switching circuit 19 is a signal of 3.58 MHz in both the recording and reproducing operations. This is because the input terminal 19a of the second switching circuit 19 is connected to the input side of the first balanced modulator 13, and the input terminal 19b is connected to the output side of the filter 16. Therefore, the third phase detector 32 need only have the function of phase detection for a signal of 3.58 MHz, so that it may be used in both the recording and reproducing operations of the VTR. The output of the first voltage controlled oscillator 22 is utilized in many ways.

In the color signal processing device described above, the first voltage controlled oscillator 22 is required to phase-lock the oscillation output with the burst signal in the recording operation of the VTR. In the reproducing operation of the VTR, a stable stationary oscillation output must be obtained. The first voltage controlled oscillator 22 is required to function in different manners in the recording and reproducing operations of the VTR.

FIG. 3 shows the construction of the first voltage controlled oscillator 22 used in the present invention. Referring to FIG. 3, the output terminal of the first phase detector 20 is connected to a phase shift control terminal of a variable phase-shifting amplifying circuit 41. The phase shift of the input and the output of the variable phase-shifting amplifying circuit 41 is varied by a voltage Vc applied to the control terminal of the variable phase-shifting amplifying circuit 41. The output terminal of the variable phase-shifting amplifying circuit 41 is connected to one input terminal of a synthesizing circuit 43 through the third switching circuit 21. The input terminal of the variable phase-shifting amplifying circuit 41 is connected to one terminal of a resonance circuit 44. The input terminal of an amplifying circuit 42 is also connected to this terminal of the resonance circuit 44. The output terminal of the amplifying circuit 42 is connected to the other input terminal of the synthesizing circuit 43. The output terminal of the synthesizing circuit 43 is connected directly or through a limiter circuit to the other terminal of the resonance circuit 44. The oscillation output $f01$ is obtained from the first-mentioned terminal of the resonance circuit 44. The first voltage controlled oscillator 22 is constructed in this manner. The vector representing the oscillation output is given by $\vec{a}$, and the vector representing the signal at the output terminal of the variable phase-shifting amplifying circuit 41 is given by $\vec{X}(Vc)$. Since the third switching circuit 21 is on in the recording operation of the VTR, the vector representing the signal at the output terminal of the synthesizing circuit 43 is $A\vec{a}+\vec{X}(Vc)$ (where A is the gain of the amplifying circuit 42) as shown in FIG. 4(a). FIG. 4(a) shows how the vecto representing the signal at the output terminal of the synthesizing circuit 43 varies with changes in the voltage Vc. Thus, a required phase shift $\pm\theta$ may be obtained by suitably selecting the voltage Vc of the variable phase range of the variable phase-shifting amplifying circuit 41. The signal whose phase is varied by $\pm\theta$ is input to the resonance circuit 44. In the resonance circuit 44, the oscillation frequency is phase- and frequency-converted to vary by $\pm\Delta f01$. The oscillation output of the first voltage controlled oscillator 22 is controlled with respect to its phase and frequency by the output Vc of the first phase detector 20, to be phase-locked with the burst signal. On the other hand, during the reproducing operation of the VTR, the third switching circuit 21 is off. Therefore, the variable phase-shifting amplifying circuit 41 is eliminated from the oscillation loop. In this case, the first voltage controlled oscillator 22 obtains a stationary oscillation output of a predetermined frequency ($f01=3.58$ MHz). Thus, the oscillation output is $A\vec{a}$, as shown in FIG. 4(b).

As has been already described, the first voltage controlled oscillator 22 is controlled so that its oscillation output is phase-locked with the burst signal in the recording operation of the VTR, and a stable stationary oscillation output is obtained in the reproducing operation of the VTR. The oscillation output of the first voltage controlled oscillator 22 is effectively utilized in many ways. The oscillation output of the first voltage controlled oscillator 22 is also supplied to the third phase detector 32. The third phase detector 32 contributes for ACC and color killer. The third phase detector 32 also detects the phase difference between the oscillation output of the first voltage controlled oscillator 22 and the burst signal from the input terminal 25. When the amplitude of the burst signal is detected to be small at the third phase detector 32, the output of the DC amplifier 33, to which the detected output is supplied, raises the gain of the color signal amplifier 12. When the amplitude of the burst signal is detected to be too big, the output of the DC amplifier 33 lowers the gain of the color signal amplifier 12. When the amplitude of the burst signal is detected to be too small, the DC amplifier 34 is operated, and the output of this DC amplifier 34 is applied to the first balanced modulator 13 as a color killer voltage. In the color killer operation state, the output of the first balanced modulator 13 is cut off. As has already been described, the third phase detector 32 is used for setting the gain of the color signal amplifier 12 and for determining the on and off states of the color killer operation. For obtaining the correct gain control and color killer information in the third phase detector 32, it is preferable that the operation of the APC circuit be stable. That is, it is preferable in the APC circuit to obtain an oscillation output (3.58 MHz) which may be correctly synchronized with the burst signal. In order to respond to this need, a circuit means is adopted (during the recording operation of the VTR) which comprises the first phase detector 20, the third switching circuit 21, and the first voltage controlled oscillator 22. In the reproducing operation of the VTR, although the first voltage controlled oscillator 22 is switched to the stationary oscillation states, the output of the first phase detector 20 is applied to the control terminal of the second voltage controlled oscillator 29 through the fourth switching circuit 28. Since the time base fluctuation components are eliminated from the regenerative color signal (3.58 MHz) at the output terminal 17, the burst signal input to the third phase detector 32 and the oscillation output (3.58 MHz) are phase-synchronized. As a result, the output obtained from the third phase detector 32 reflects the correct gain control and color killer information. The first voltage controlled oscillator 22, due to its stable operation as has been described, is utilized in many ways and enables the correct gain control and color killer information to be obtained from the third phase detector 32.

In the system of the color signal processing device described above, the second voltage controlled oscillator 29 forms an AFC loop in the recording operation of the VTR. Thus, the second phase detector 27, the fourth switching circuit 28, the second voltage controlled oscillator 29, and the divider 30 form an AFC loop. In this manner, the oscillation output of the second voltage controlled oscillator 29 is phase-synchronized with the horizontal sync signal. This indicates that the relation between the frequencies of the color signal and the luminance signal before recording is equivalent to the relation between the low frequency converted color signal and the FM luminance signal recorded on the magnetic tape. The second voltage controlled oscillator 29 forms an APC loop in the reproducing operation of the VTR. The APC loop is formed by the first balanced modulator 13, the band-pass filter 16, the second switching circuit 19, the first phase detector 20, the fourth switching circuit 28, the second voltage controlled oscillator 29, the divider 31, the second balanced modulator 23, and the band-pass filter 24. This APC loop functions to remove the time base fluctuation components of the regenerative low frequency converted color signal (688 kHz). That is, the oscillation output of the second voltage controlled oscillator 29 is so controlled as to remove the time base fluctuation components contained in the regenerative low frequency converted color signal. Since this APC loop controls the phase of a relatively high frequency signal, i.e., the regenerative low frequency converted color signal, it advantageously has a high response speed. This APC loop is thus effective when the VTR is switched to a special state, such as the stationary picture reproducing states, the fast forward reproducing states, or the slow reproducing states. The color signal processing device described above is constructed to eliminate as many external capacitors as possible in order to reduce the number of pins required for making the device with integrated circuits. The first balanced modulator 13 is so constructed that the converting signal F03 does not leak during the color killer operation. FIG. 5 shows the first balanced modulator 13 which is capable of contributing to the reduction in the number of pins and to the elimination of leakage of the converting signal.

Referring to FIG. 5, reference numeral 23 denotes to the second balanced modulator; 24, the band-pass filter; 12, the color signal amplifier; 34, the DC amplifier for outputting a color killer voltage; and 14, 16, filters. The output terminal of the color signal amplifier 12 is connected to the base of a transistor Q2 through a coupling capacitor 51. The transistors Q1, Q2, Q3, Q4, Q5 and Q6 make up a double-balanced analog multiplier. The bases of the transistors Q1 and Q2 are connected to a biasing power source E1 through resistors 52 and 53, respectively. The emitters of the transistors Q1 and Q2 are connected to a constant current source 56 through resistors 54 and 55, respectively. The collector of the transistor Q1 is connected to the common emitter of the transistors Q3 and Q4, and the collector of the transistor Q2 is connected to the common emitter of the transistors Q5 and Q6. The commonly connected collectors of the transistors Q3 and Q5 are connected to a power source line 58. The commonly connected collectors of the transistors Q4 and Q6 are connected through a resistor 59 to the power source line 58 as well as to the base of a transistor Q7. Transistors Q7 and Q8 comprise a switching circuit of the differential amplifier type. The collectors of the transistors Q7 and Q8 are connected to the power source line 58. The emitter of the transistor Q7 is connected to a series circuit of diodes D1 and D2 and the emitter of the transistor Q8 is connected to a diode D3. The commonly connected cathodes of the diodes D2 and D3 are connected to a reference potential terminal through a resistor 60 as well as to the filters 14 and 16. The base of the transistor Q8 is connected to the power source line 58 through a resistor 61 as well as to the collector of a transistor Q9 through a resistor 62. The emitter of the transistor Q9 is connected to the reference potential terminal, and the base of it is connected to the output terminal of the DC amplifier 34. The transistors Q1 to Q9 and so on comprise a frequency converting part. The signal output from the color signal amplifier 12 is frequency-converted by the double-balanced analog multiplier and is obtained at the side of the filters 14 and 16 through the switching circuit. If the color signal is normal, the output of the DC amplifier 34 becomes high level. This output becomes low level for color killer operation. When the base of the transistor Q9 is at high level, the transistor Q9 is on, the transistor Q8 is off, and the transistor Q7 is on. In this case, the output of the analog multiplier is input to the filters 14 and 16 through the transistor Q7. When the base of the transistor Q9 is at low level, the transistor Q8 is on and the transistor Q7 is off. In this case, the output of the analog multiplier is cut off. The converting signal F03 is input to the analog multiplier through the converting signal input circuit part for performing frequency conversion. The output of the second balanced modulator 23 is input to the filter 24. The output of the filter 24 is input to the base of a transistor Q10 through a capacitor 63. The base of the transistor Q10 is connected to the reference potential terminal through a series circuit of a resistor 64 and a capacitor 65, and the emitter is connected to the reference potential terminal through a resistor 66. The collector of the transistor Q10 is connected to the power source line 58 through a parallel circuit of a resistor 68 and a capacitor 69, which comprise a CR type low-pass filter 67. The collector of the transistor Q10 is connected to the base of a transistor Q11 forming a buffer circuit. The collector of the transistor Q11 is connected to the power source line 58, and its emitter is connected to the reference potential terminal through a resistor 70. The emitter of the transistor Q11 is connected to the base of a transistor Q14 through a capacitor 72 comprising a CR type high-pass filter 71. The base of the transistor Q14 is connected to the emitter of the transistor Q13 through a resistor 73 to set a bias. The emitter of the transistor Q13 is connected to the base of a transistor Q15 through a resistor 74. The transistors Q14 and Q15 comprise a waveform-shaping circuit, and the emitters thereof are connected to a constant current source 75. The collectors of the transistors Q14 and Q15 are connected to the emitter of a transistor Q12 through resistors 76 and 77, respectively. The transistors Q12 and Q13 comprise a biasing circuit. A series circuit of resistors 78, 79 and 80 is connected between the power source line 58 and the reference potential terminal. The base of the transistor Q12 is connected to the node of the resistors 78 and 79, and the base of the transistor Q13 is connected to the node of the resistors 79 and 80. The emitter of the transistor Q13 is connected to the reference potential terminal through a resistor 81. The collector of the transistor Q15 is connected to the bases of the transistors Q4 and Q5 through a resistor 82 to set a base bias. The collector of the transistor Q14 is connected to the bases of the transistors Q3 and Q6 through a resistor 83 to supply carrier signals. The converting signal output from the filter 24 passes through the transistor Q10, the low-pass filter 67, the transistor Q11, the high-pass filter 71, the transistor Q14, and the resistor 83 to the frequency conversion part.

In the first balanced modulator 13 described above, the converting signal input circuit part comprising the transistors Q10 to Q15 and so on may be equivalently shown in FIG. 6. Reference numeral 67 denotes the low-pass filter consisting of the resistor 68 and the capacitor 69; 91, a buffer circuit consisting of the transistor Q11 and so on; 71, a high-pass filter consisting of the capacitor 72 and the resistor 73; and 92, a waveform-shaping circuit consisting of the transistors Q14, Q15 and so on. Reference numeral 93 denotes a frequency conversion part consisting of the transistors Q1 to Q9 and so on. In this converting signal input circuit, the high frequency cut-off frequency $f_h$ of the low-pass filter 67 is:

$$f_h = \frac{1}{2\pi C1R1}$$

The low frequency cut-off frequency $f_l$ of the high-pass filter 71 consisting of the capacitor 72 and the resistor 73 is:

$$f_l = \frac{1}{2\pi C2R2}$$

where C1 and C2 are the capacitances of the capacitors 69 and 72, and R1 and R2 are the resistances of the resistors 68 and 73.

The filter constants of the respective filters 67 and 71 are so selected that $C1R1 \approx C2R2$. Consequently, the overall frequency characteristics at the converting signal input circuit part may be made flat as shown in FIG. 7(c). The frequency characteristics of the low-pass filter 67 and the frequency characteristics of the high-pass filter 71 hold the relation shown in FIGS. 7(a) and 7(b). Accordingly, the overall frequency characteristics of these are flat, as shown in FIG. 7(c). When the network described above is formed in integrated circuits, the filter constants ($C1R1 \approx C2R2$) mentioned above are determined taking into consideration the collectorsubstrate capacitance of the transistor, and the floating capacitance. In the above network, if the resistance of the resistor 68 of the low-pass filter 67 is selected to be relatively large, the collector-substrate capacitance of the transistor may be utilized as the capacitor 69. Furthermore, in the above network, the waveformshaping circuit 92 comprises the transistors Q14, Q15 and so on. The output of the waveform-shaping circuit 92 is obtained as a differential output through the resistors 82 and 83. The differential output is applied to the common base of the transistors Q4 and Q5 and the common base of the transistors Q3 and Q6 as a differential input. As a result, the switching operation of the transistors Q14 and Q15 may be transmitted to the transistors Q3, Q4, Q5 and Q6 in a stable manner without being affected by temperature variations. The transistors Q14 and Q15 and so on comprise a limiter of the differential amplifier type. Thus, one period of the carrier signal has a duty of 50% in the negative and positive directions from a predetermined DC level as the middle point. Accordingly, since the waveformshaping circuit 92 has a stable function as an amplitude limiter, adverse effects caused by variations in the capacitance of the capacitor 72 may be eliminated. The above network is thus capable of responding to one period of the converting signal without distortion being generated in the high frequency components by the high-pass filter. The waveform-shaping circuit 92 also functions as an amplitude limiter of the differential amplifier type. The converting signal of good characteristics is input to the frequency conversion part of the next stage.

The frequency conversion part 93 has a switching circuit consisting of the transistors Q7 and Q8; the diodes D1, D2 and D3 and so on, as shown in FIG. 5. The diodes D1, D2 and D3 of the switching circuit effectively function to prevent leakage of the converting signal. These diodes D1, D2 and D3 also perform the reverse voltage resistance compensation and the temperature compensation between the bases and emitters of the transistors Q7 and Q8. When the video tape recorder is in the recording state, the color signal (3.58 MHz) is input to the base of the transistor Q2. This color signal (3.58 MHz) is heterodyne- and frequency-converted by the converting signal at the part of the transistors Q3 to Q5. The converted output is obtained from the common collector of the transistors Q4 and Q6. In the color mode, since the base potential of the transistor Q9 is at high level, the transistor Q7 is on. In the monochome mode, since the base potential of the transistor Q9 is at low level, the transistor Q8 is on and the transistor Q7 is off.

In the monochrome mode, the leakage eL1 of the carrier signal may be calculated in the manner to be described below. The leakage eL1 at the common collector (P1 point) of the transistors Q4 and Q6 is considered first. Two paths are possible as the path of leakage of the converting signal. One path extends from the base of the transistor Q6 to its collector. The other path extends from the base of the transistor Q6 and follows its emitter, the base of the transistor Q5, and the collector of the transistor Q4.

The leakage eL1 of the converting signal e1 to the common collector of the transistors Q4 and Q6 may be represented by the following equation:

$$eL1 = \frac{R11}{R + \frac{1}{j\omega(C11 + CA)}} \times e1$$

Therefore, $$|eL1| = \frac{(C11 + CA)R11}{\sqrt{1 + \{\omega(C11 + CA)R11\}^2}} \times |e1|$$

where
R11 is the resistance of the resistor 59,
C11 is the collector-base capacitance of the transistor Q6,
C12 is the base-emitter capacitance of the transistor Q6,
C13 is the base-emitter capacitance of the transistor Q5,
C14 is the base-collector capacitance of the transistor Q4, and $$\frac{1}{CA} = \frac{1}{C12} + \frac{1}{C13} + \frac{1}{C14}$$

When C11=C14=0.5 pF and C12=C13=1 pF, Ca=0.25 pF.

When the frequency F03 of the carrier signal is 4.27 MHz and R11=2.4 k$\Omega$, $$1 >> \{\omega(C11+CA)R11\}^2$$

Therefore, $$|eL1| \approx \omega(C11 + CA)R11 \, |e1|$$
$$\approx 0.048 \cdot |e1|$$

About 5% of the converting signal is leaked to the common collector of the transistors Q4 and Q6. However, these leakage components may be suppressed considerably by the switching circuit of the next stage.

The leakage components appear as suppressed at the output terminal (point P2) through parasitic capacitors C15, C16 and C17. The leakage eL2 at the point P2 may be represented by the following approximation:

$$|eL2| \approx \omega \cdot CB \cdot re \cdot |eL1|$$

where $$\frac{1}{CB} = \frac{1}{C15} + \frac{1}{C16} + \frac{1}{C17}$$

$$(\omega \cdot CB \cdot re << 1)$$

C15 is the base-emitter capacitance of the transistor Q7,
C16 is the capacitance of the diode D1,
C17 is the capacitance of the diode D2, and
re is the output impedance.

When CB=0.5 pF, the converting signal frequency F03 is 4.27 MHz, and re=30 $\Omega$, $$eL2 \approx 4 \times 10^{-4} \times |eL1|$$

As may be seen from the above approximation, the leakage components are suppressed by $4 \times 10^{-4}$ (about $-68$ dB) in the switching circuit. As was described hereinabove, the first balanced modulator includes a filter unit for the converting unit so that it contributes to reducing the number of pins as well as suppressing the leakage of the converting signal in the color killer operation.

What we claim is:
1. A color signal processing device characterized by comprising:
a color signal amplifying circuit to which is selectively input through a first switching circuit an original color signal or a regenerative low frequency converted color signal according to the recording/reproducing mode of a video tape recorder, and which is gain-controlled by gain control means;
a first balanced modulator to which is input an output of said color signal amplifying circuit as well as a converting signal to provide a balanced modulated output of both input signals, and which has a control terminal for enabling control by color killer means;
a low-pass filter and a band-pass filter to which is input an output of said first balanced modulator;
a second switching circuit, to a first input terminal of which is input an output of said color signal amplifying circuit, and to a second input terminal of which is input an output of said band-pass filter, for selectively obtaining the signal at said first input terminal or said second input terminal according to the recording/reproducing mode of the video tape recorder;
a first phase detector, to one input terminal of which is input an output of said second switching circuit, and to the other input terminal of which is input an oscillation output of a first voltage controlled oscillator, for detecting a phase difference between the two input signals in a gate pulse period of a burst signal;
a third switching circuit, to which is input a phase detection output of said first phase detector, and which inputs or does not input this to an oscillation output control terminal of said first voltage controlled oscillator according to the recording/reproducing mode of the video tape recorder;
a second balanced modulator, to one input terminal of which is input an oscillation output of said first voltage controlled oscillator, and to the other input terminal of which is input a divided output of a first divider for dividing the oscillation output of a second voltage controlled oscillator, for applying a balanced modulated output of the two input signals to a converting signal input terminal of said first balanced modulator through a filter;

a second phase detector, to one input terminal of which is input a divided output of a second divider for dividing an oscillation output of said second voltage controlled oscillator, and to the other input terminal of which is input a horizontal sync signal, for obtaining a phase-detection output representing a frequency synchronization error of the two input signals; and a fourth switching circuit, to a first input terminal of which is input a phase detection output of said second phase detector, and to a second input terminal of which is input a phase detection output of said first phase detector, for selectively inputting signals of said first and second input terminals to an oscillation output control terminal of said second voltage controlled oscillator according to the recording/reproducing mode of the video tape recorder.

2. A color signal processing device according to claim 1, characterized in that said gain control means for said color signal amplifier and said color killer means for said first balanced modulator comprises a third phase detector, to one input terminal of which is input an output of said second switching circuit, and to the other input terminal of which is input an oscillation output of said first voltage controlled oscillator for detecting a phase difference between the two input signals; means for supplying an output of said third phase detector as a gain control signal to a gain control terminal of said color signal amplifier; and means for supplying an output of said third phase detector as a color killer signal to a control terminal of said first balanced modulator.

3. A color signal processing device according to claim 1, characterized in that said first voltage controlled oscillator comprises an amplifying circuit to which is input a resonance output of a resonance circuit; a variable phase-shifting amplifying circuit to which are input a resonance output of said resonance circuit and an output of said first phase detector at a phase shift control terminal; and a synthesizing circuit, to one input terminal of which is input an output of said amplifying circuit, and to the other input terminal of which is input an output of said variable phase-shifting amplifying circuit, for feeding back its output to said resonance circuit.

4. A color signal processing device according to claim 1, characterized in that said first balanced modulator comprises a CR type low-pass filter to which is input a converting signal; a buffer circuit to which is input an output of said low-pass filter; a CR type high-pass filter to which is input an output of said buffer circuit and which has a time constant same as that of said low-pass filter; a waveform-shaping circuit to which is input an output of said high-pass filter and which functions as an amplitude limiter; a double-balanced analog multiplier, to one input terminal of which is input an output of said waveform-shaping circuit, and to the other input terminal of which is input an output of said color signal amplifier; and a switching circuit of the differential amplifier type, to one input terminal of which is input an output of said double-balanced analog multiplier, and to the other input terminal of which is input a color killer signal through a switching transistor.

5. A color signal processing device in a system for recording and reproducing composite color signals, comprising:

a first oscillator disposed within a first phase locked loop and operating as a voltage controlled oscillator for generating a signal of a first frequency in phase synchronism with a first reference signal obtained from an original composite color signal to be recorded when the system is set to recording mode;

a second oscillator disposed within a second phase locked loop for generating a signal of a second frequency in response to a second reference signal obtained from the original composite color signal;

a frequency converting circuit for generating a frequency converting signal for converting the frequency of the original composite color signal, said frequency converting signal being obtained from the signal of the first frequency and the signal of the second frequency;

a mode switching means for disconnecting the first and second oscillators respectively from the first and second phase locked loop when the system is set to reproducing mode and for causing the first oscillator to operate as a free running oscillator for generating a signal of the first frequency;

a third phase locked loop formed for the second oscillator in response to the operation of the mode switching means when the system is set to reproducing mode;

a frequency converting circuit for generating a frequency converting signal for converting the frequency of the composite color signal recorded to the frequency of the original composite color signal when the system is set to reproducing mode, said frequency converting signal being obtained from the signal of the second frequency generated by the second oscillator within the third phase locked loop and the signal of the first frequency generated by the first oscillator; and a phase locked means disposed withing the third phase locked loop for phase-locking a color signal of the original frequency with the output signal of the first oscillator when the system is set to reproducing mode, said color signal being obtained by converting the frequency of a color signal to be reproduced, using the frequency converting signal.

* * * * *